(12) United States Patent
Takihiro et al.

(10) Patent No.: US 6,700,874 B1
(45) Date of Patent: Mar. 2, 2004

(54) NETWORK SYSTEM HAVING ROUTE VERIFICATION FUNCTION AND THE COMPONENT APPARATUSES AND METHOD THEREOF

(75) Inventors: Masatoshi Takihiro, Yokohama (JP); Takeshi Ishizaki, Yokohama (JP); Osamu Takada, Sagamihara (JP); Tohru Setoyama, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/479,920

(22) Filed: Jan. 10, 2000

(30) Foreign Application Priority Data

Jan. 11, 1999 (JP) .......................................... 11-004304

(51) Int. Cl.$^7$ ............................................. H04L 12/26
(52) U.S. Cl. ........................ 370/248; 370/252; 370/400
(58) Field of Search ................................. 370/389, 254, 370/351, 40, 400, 392, 255, 223, 224, 248, 252, 395.31, 522

(56) References Cited

U.S. PATENT DOCUMENTS

| | | | | |
|---|---|---|---|---|
| 5,130,974 A | * | 7/1992 | Kawamura et al. | ......... 370/217 |
| 5,341,364 A | * | 8/1994 | Marra et al. | ................. 370/223 |
| 5,453,979 A | * | 9/1995 | Schibler et al. | ........ 370/395.32 |
| 5,987,521 A | * | 11/1999 | Arrowood et al. | .......... 709/239 |

OTHER PUBLICATIONS

OSPF Version 2, Network Working Group Request for Comments;2328, STD 54, Ascend Communications, Inc., Apr. 1998, p. 1–6.*

A Border Gateway Protocol 4 (BGP–4), Network Working Group Request for Comments: 1771, T.J. Watson Research Center, IBM Corp., Mar. 1995, p. 1–57.*

Private Network–Network Interface Specification Version 1.0 (PNNI 1.0), The ATM Forum Technical Committee, af–pnni–0055.000, Mar. 1996, p. v–xv.*

Multi–Protocol Over ATM Version 1.0, The ATM Forum Technical Committee, AF–MPOA–0087.000, May 1997, p. 3–9.*

* cited by examiner

Primary Examiner—Melvin Marcelo
(74) Attorney, Agent, or Firm—Antonelli, Terry, Stout & Kraus, LLP

(57) ABSTRACT

Switches create and manage routes with route control protocols such as BGP-4, PNNI, etc. and a route management apparatus is notified of the information of the routes, created by these protocols, and the route management apparatus verifies the validity of a route of which the apparatus is notified by a switch based on the route information of the whole network composed of the plurality of pieces of information given by respective switches and the management policy set by a network manager. In the verification of validity, it is confirmed that the transmitted data are able to arrive at the destination securely and the set route is not against the management policy, and the route-usage-permission-notice of a route confirmed of its validity by the route management apparatus is transmitted to respective switches. Thereby, in the route control of a network using a route control protocol, it is made possible to prevent the occurrence of an abnormal route caused by the difference in the speed of operations of respective switches or an erroneous setting of a switch.

11 Claims, 18 Drawing Sheets

ROUTE TABLE 25

| DESTINATION | OUTPUT LINE |
|---|---|
| 3a | 6c |
| 3b | 6b |
| ⋮ | ⋮ |

VALID ROUTE TABLE 27

| DESTINATION | OUTPUT LINE |
|---|---|
| 3a | 6c |
| 3b | 6c |
| ⋮ | ⋮ |

FIG. 12

WHOLE FORWARDING TABLE
43

| SWITCH # | DESTINATION | OUTPUT LINE |
|---|---|---|
| 2a | 3a | 6c-3a |
|  | 3b | 6b-2d |
|  | ⋮ | ⋮ |
| 2b | 3a | 6a-2a |
|  | 3b | 6d-2c |
|  | ⋮ | ⋮ |
| 2c | 3a | 6e-2b |
|  | 3b | 6f-3b |
|  |  |  |
| 2d | 3a | 6g-2a |
|  | 3b | 6h-2c |
|  |  |  |

| SWITCH # | OUTPUT LINE | DESTINATION | AVAILABLE/ UNAVAILABLE |
|---|---|---|---|
| 2a | 6c | 3b | AVAILABLE |
| | | 3d | UNAVAILABLE |
| | | ⋮ | ⋮ |
| | 6b | 3d | UNAVAILABLE |
| | | 3a | UNAVAILABLE |
| | | ⋮ | ⋮ |
| | ⋮ | | |
| ⋮ | | | |

| SWITCH # | OUTPUT LINE | SOURCE | DESTINATION | AVAILABLE/ UNAVAILABLE |
|---|---|---|---|---|
| 2a | 6c | 3a | 3b | AVAILABLE |
|  |  | 3b | 3d | UNAVAILABLE |
|  |  | ⋮ | ⋮ | ⋮ |
|  | 6b | 3a | 3d | UNAVAILABLE |
|  |  | 3d | 3a | UNAVAILABLE |
|  |  | ⋮ | ⋮ | ⋮ |
|  | ⋮ |  |  |  |
| ⋮ |  |  |  |  |

45A

ROUTE MANAGEMENT APPARATUS 4

ROUTE TABLE 25d

| DESTINATION | OUTPUT LINE |
|---|---|
| 3a | 6g−2a |
| 3b | 6i−2b |
| ⋮ | ⋮ |

FIG. 28

WHOLE FORWARDING TABLE
43

| SWITCH # | DESTINATION | OUTPUT LINE |
|---|---|---|
| 2a | 3a | 6c-3a |
|  | 3b | 6b-2d |
|  | ⋮ | ⋮ |
| 2b | 3a | 6a-2a |
|  | 3b | 6d-2c |
|  | ⋮ | ⋮ |
| 2c | 3a | 6e-2b |
|  | 3b | 6f-3b |
|  |  |  |
| 2d | 3a | 6g-2e |
|  | 3b | 6i-2b |
|  |  |  |

FIG. 29

ROUTE TABLE
25b

| DESTINATION | OUTPUT LINE |
|---|---|
| 3a | 6a |
| 3b | 6a |
| ⋮ | ⋮ |

NETWORK SYSTEM HAVING ROUTE VERIFICATION FUNCTION AND THE COMPONENT APPARATUSES AND METHOD THEREOF

BACKGROUND OF THE INVENTION

1. Field of the Invention

The present invention relates to a route control technique which guarantees the validity of a route from the point of view of the management policy in the judgement whether transmitted data arrive at the destination securely or not and in the selection of a route in a network being composed of a plurality of switches (network equipment such as routers or ATM switches including networks linking to them).

2. Description of the Prior Art

With the development of computer techniques and the communication techniques, the scale of a computer network is growing larger and the configuration is also growing more and more complicated. In a network of a large scale and of a complicated configuration, the demand for the route control technique which makes it always possible to secure a proper route between a transmitter and a receiver is growing higher.

In the case of a network which is commonly used by a large number of people having a variety of demands like an Internet, the demand for the route control according to a network management policy (a predetermined rule from an operational point of view or a managerial point of view in a network, hereinafter referred to as simply a management policy) is also growing higher.

It is also made possible to separate routes for every user by the route control according to the management policy.

For a route control technique, protocols as shown in the following have been developed: the OSPF (Open Shortest Path First) and BGP-4 (Border Gate Protocol 4) by IETF (Internet Engineering Task Force), PNNI (Private Network-Network Interface) by ATM Forum, and so on. In the case of the above, respective switches perform autonomous route control, so that even in the case of a trouble in a part of switches or lines, the route control is continued by the other switches. Therefore, the above system is said to have an advantage of being strong against troubles.

However, the conventional systems have problems as shown below.

(1) A temporary line trouble

Even in a case of a change in a network configuration, a route can be held normal by the route control using the protocols mentioned in the above. For example, when a trouble occurs in a certain line or switch, a route bypassing the trouble is reset with the exchanges of route information among the switches. In the case of such a resetting, by an erroneous setting of a switch or switches, for example, such operations may occur in the network: a packet of transmission data without reaching a receiver goes round and round in the network, or the route forms a looped route. In such a case, the line trouble can be kept as it is until the error is corrected by a manager, and the influence can be serious. The setting of a switch is performed independently for every switch, so that time differences in resetting from each other may occur, which can be a cause to prevent transmitted data from being received by a receiver.

(2) Difficulty in the uniformity of management policy

In order to execute the route control in which consideration is paid to the management policy using the above-mentioned route control protocol, the management policy information is set in respective switches in the network. For example, when there are a plurality of routes for a destination, the information for judging which route is the most desirable one will be set in respective switches.

However, since the management information is set in respective switches, a route which does not satisfy the management policy intended by a network manager can be selected caused by an erroneous setting of a certain switch.

At present, as one of the purposes to solve the problems mentioned in the above (1) and (2), a route server by IETF and MPOA by ATM forum are proposed.

Both of them adopt a system in which the routes in the network are batch-processed by collecting the route information to a server called a route server which manages the route information. Therefore, a temporary line trouble as shown in item (1) due to the contradiction in route information in switches does not occur easily. Because of the centralized management of the policy information by a server, it is easy to unify the management policy not to cause the trouble as shown in item (2).

However, in the case of these server systems, there is a problem that the breakdown of a server causes the breakdown of the whole system.

SUMMARY OF THE INVENTION

An object of the present invention is to provide a network system with route verification function which prevents the occurrence of an abnormal route caused by an erroneous setting of a switch, leaving the effect of being resistant to troubles of the route control protocol system of an autonomous decentralized type, a route management apparatus, switches, and a method for operating them.

In order to achieve the above-mentioned object, the present invention provides a network system and a method of operation thereof, wherein the network system comprises a route management apparatus with a route verification means for verifying the validity of communication routes between a terminal and a switch or between switches connected to the communication network being composed of communication lines to which a plurality of switches are connected; and the above-mentioned plurality of respective switches store the route information concerning a communication route corresponding to a destination, and perform switching to output information to the communication route corresponding to the destination contained in a route information obtained by referring to the contents of the stored data, and when the above-mentioned route information is changed, they transmit a route-usage-permission-request of the route to be changed to the route management apparatus and on receiving a route-usage-permission-notice of the route to be changed sent from the route management apparatus, the stored route information is updated.

The present invention provides a communication route update system and method thereof by a route management apparatus connected to a communication network composed of communication lines to which a plurality of switches are connected and the update method of the operating system thereof, comprising storing route information for switches concerning a communication route between a terminal and a switch or between switches connected to a communication network composed of communication lines to which a plurality of switches are connected; receiving a route-usage-permission-request when the route-usage-permission-request of a communication route between a terminal and a switch or between switches connected to said communication network is transmitted from one of the plurality of switches; verifying the validity of a communication route concerning said route-usage-permission-request; a notification means for notifying one of the plurality of switches which has transmitted said route-usage-permission-request of a usage permission of a route verified by said route verification means; and an update means for updating the route information which has stored in said storage means for the route information of the communication route to which said permission notice is given.

Further, the present invention denotes a communication route update system by a switch in the communication network system composed of a plurality of switches, communication lines connected to the switches, and a route management apparatus managing the communication routes of the above-mentioned switches, and the method thereof, wherein the switches store the route information concerning the communication route corresponding to a destination and output information to the communication route corresponding to the destination contained in the route information obtained referring to the stored information, and when one of them updates the route information, it transmits a route-usage-permission-request of a route to be changed to the route management apparatus, and on receiving the route-usage-permission-notice of the route to be changed from the route management apparatus, the stored route information is updated.

The problem (1) written in the above is caused by the fact that each switch in the network sets a route on a forwarding table independently, so that the route update in the whole network are not synchronized. Therefore, in the present invention, when the necessity a route update occurs each switch does not write the updated route information in its storage immediately, and at first, shall transmits the route information as a route-usage-permission-request to the route management apparatus by a transmission means. The route management apparatus holds the plurality of pieces of route information sent from respective switches, and verifies whether transmitted data arrive at the destination securely or not with the route verification means, and only for a route which does not form an abnormal route (a valid route), a route-usage-permission-notice is sent to the switch or switches. On receiving the route-usage-permission-notice of the route, the switch registers the route onto its storage and updates the route information. The route-usage-permission-notices of routes from the route management apparatus are transmitted to the object switches almost simultaneously. Therefore, even if the transfer delay in the network is considered, according to the present invention, synchronized route updates in the whole network are performed in a few seconds, and the verification of a route is also performed; thereby the occurrence of an abnormal route can be avoided.

The route management apparatus further comprises a notification means notifying the switch which has transmitted the usage permission request, when it is verified that the transmitted data do arrive at the destination through the route mentioned in the transmitted route-usage-permission-request, of the receipt confirmation of the route-usage-permission-request and if the respective switches, after the lapse of a predetermined period of time from the transmission of the route-usage-permission-request of the route, receive neither the receipt confirmation of a route-usage-permission-request nor the route-usage-permission-notice of the route from the route management apparatus, the stored route information concerning the route can be updated. As mentioned in the above, when it is verified that the transmitted data will not arrive at the destination, the route management apparatus notifies the switch which transmitted the route-usage-permission-request that the receipt confirmation of the route-usage-permission has been sent; thereby when the switch receives neither a receipt confirmation of a route-usage-permission-request nor a route-usage-permission-notice of the route, the switch is able to set the route information onto its storage regarding that a fault has occurred in the route management apparatus, thus the system is capable of being operated as an ordinary autonomous decentralized system, which makes it possible to avoid the breakdown of the whole network system.

In order to solve the problem (2), the route verification means can be arranged in such a manner that it verifies whether the route matches with the predetermined management policy or not. Thereby a route which is not intended to have by a manager can be prevented from being set, which is caused by an erroneous setting of the management policy information in a switch, etc.

When the route verification means in a route management apparatus holds a route information which is verified that the transmitted data do not arrive at the destination, for a predetermined period of time, if the apparatus further comprises an output means to output the information of such a state as mentioned in the above to an external circuit, it is able to notify a manager that there is a probability of an erroneous setting in a switch.

The foregoing and other objects, advantages, manner of operation and novel features of the present invention will be understood from the following detailed description when read in connection with the accompanying drawings.

BRIEF DESCRIPTION OF THE DRAWINGS

FIG. 12 shows an illustrative drawing showing an example of the whole forwarding tables held by the route management apparatus in the first embodiment;

FIG. 28 shows an illustrative drawing showing an example of the whole forwarding table held by the route management apparatus in the first embodiment;

FIG. 29 shows an illustrative drawing showing an example of a route table in the switch 2b;

DETAILED DESCRIPTION OF THE PREFERRED EMBODIMENTS

Figure 1:
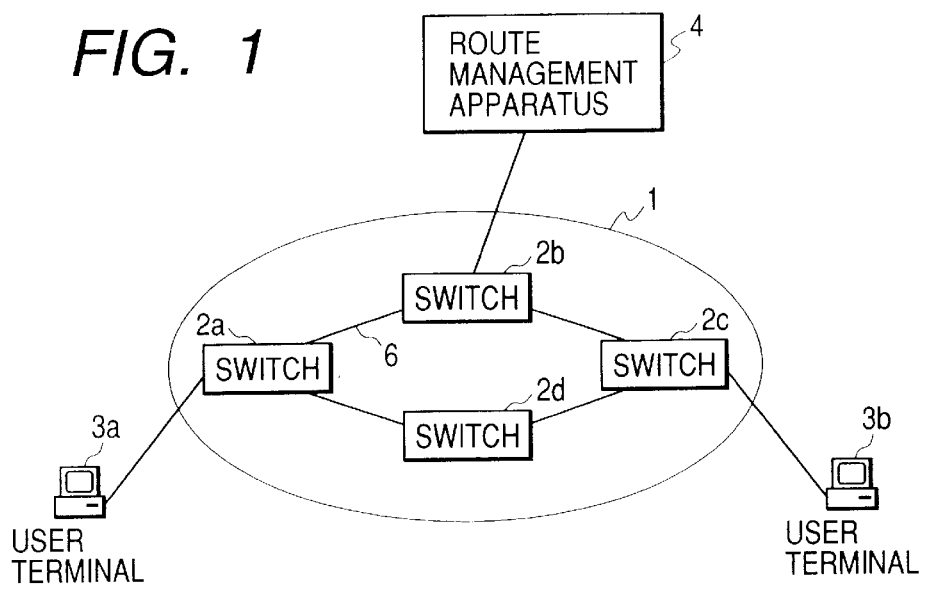
FIG. 1 shows a configuration diagram showing the whole network system according to the present invention.

In the following, the embodiments according to the present invention will be explained referring to the drawings.

At first, the first embodiment according to the present invention will be explained.

FIG. 1 shows the configuration diagram of the whole network concerning the first embodiment according to the present invention. In the example shown in FIG. 1, a network 1 is composed of 4 switches, 2a to 2d, being connected to each other with communication lines 6. To be concrete, respective switches, 2a to 2d, are network equipment such as ruters, ATM switches, etc. In FIG. 1, 2 units of user terminals, 3a and 3b, are respectively accommodated in the switches, 2a and 2c. Respective user terminals, 3a and 3b, are network equipment of users accommodated in the network 1, and in FIG. 1, an example using a PC (Personal Computer) is shown; however when it is the network equipment such as a router or an ATM switch, equipment linking to them such as a private network, etc. are included in the object equipment. Further, in the example shown in FIG. 1, the route management apparatus 4 which manages the validity of the route between user terminals is connected to the switch 2b. To be concrete, the route management apparatus is realized by a computer such as a PC.

Figure 2:
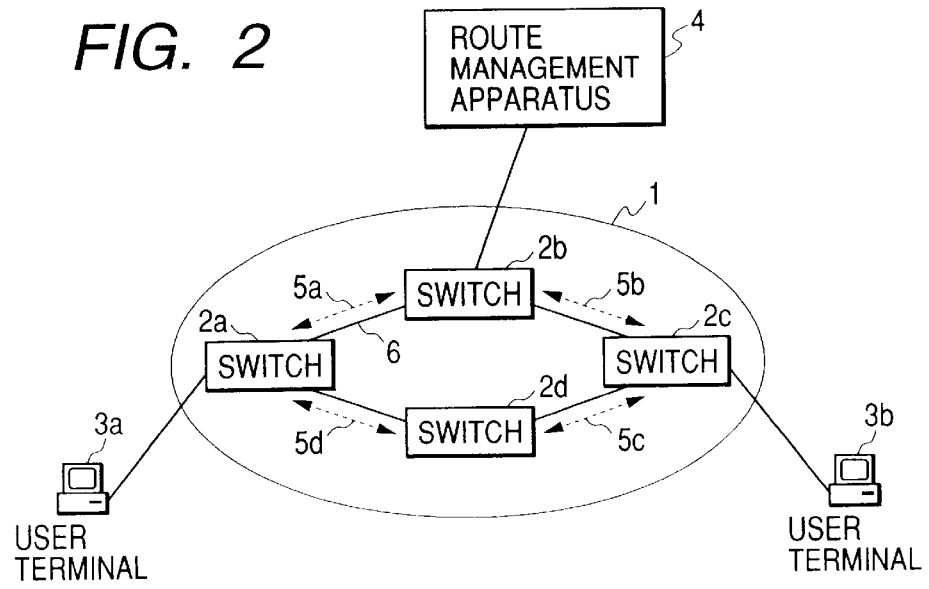
FIG. 2 shows an illustrative drawing showing the switching of route information by a route control protocol.

In the network 1 shown in FIG. 1, as shown with arrow marks, 5a to 5d, in FIG. 2, respective switches create route tables showing the route between user terminals in exchanging route information among switches. The route control protocol which prescribes the contents of the route information and the exchange rule is prescribed according to the kind of the network. For example, in the case of a network by routers, OSPF (Open Shortest Path First), BGP-4 (Border Gate Protocol 4), etc. are prescribed. In the case of a network by ATM switches, PNNI (Private Network-Network Interface), etc. are prescribed. In respective switches, for example, when a fault occurs in a line, they detect that the line can not be used, and the update of a route information is performed in order that data are transferred through the other line.

Figures 3, 4:
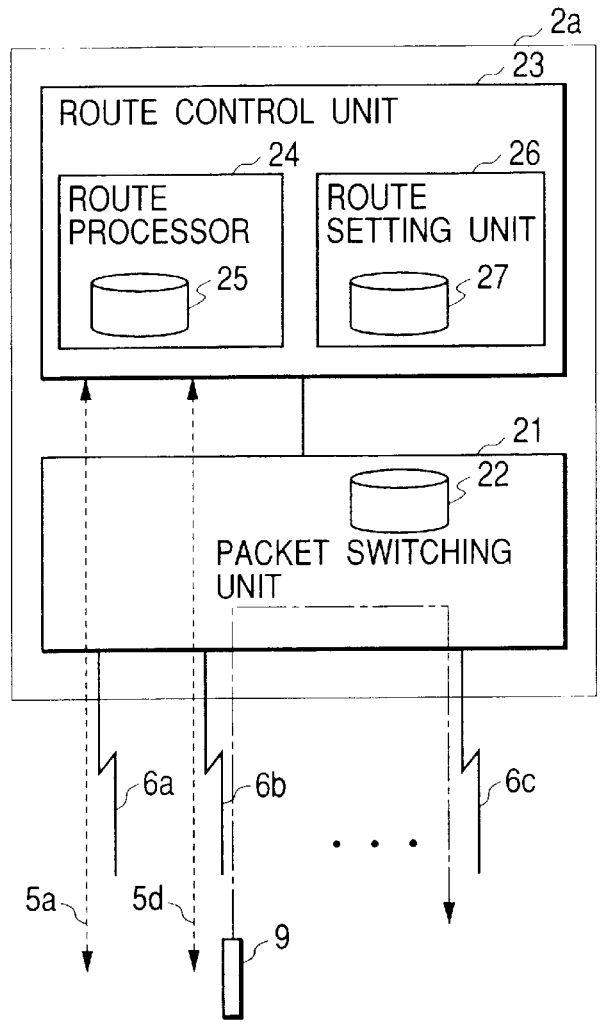
FIG. 3 shows an illustrative drawing showing the configuration of a route management apparatus according to the present invention.
FIG. 4 shows an illustrative drawing showing an example of a forwarding table.

Next, the configuration of a switch will be explained referring to FIG. 3. FIG. 3 shows a functional block diagram of the switch 2a.

The configurations of other switches, 2b to 2d, are identical to that show in FIG. 3.

As shown in FIG. 3, the switch 2a accommodates the communication lines, 6a to 6c, and comprises a packet switching unit 21 which performs the transfer of packets, the transfer data, and a route control unit 23 which performs the decision and setting of routes, and the route control unit 23 and the packet switch unit 21 are connected to each other.

The route control unit 23 decides a route according to a route control protocol, and comprises a route computation unit 24 which creates a route table 25, and a route setting unit 26 which creates a valid route table 27 in exchanging control information with a route management apparatus 4, and sets the information on a forwarding table 22.

As control information, there are a route-usage-permission-request, a route-usage-permission-notice, a receipt confirmation of a route-usage-permission-request, and so on.

The packet switch unit 21 transfers a packet 9 among the communication lines, 6a to 6c, according to the forwarding table 22 in which destination route is shown.

FIG. 4 shows an illustrative drawing showing an example of the contents of the forwarding table 22. In FIG. 4, the forwarding table 22 is a table showing the correspondence between a destination and an outgoing line in order to output each packet input to the packet switch unit to a proper communication line corresponding to the packet destination.

Figures 5, 6, 7:
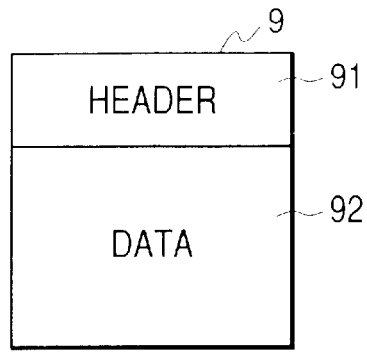
FIG. 5 shows an illustrative drawing showing the configuration of a packet.
FIG. 6 shows an illustrative drawing showing an example of a route table.
FIG. 7 shows an illustrative drawing showing an example of a valid route table.

The configuration of a packet is shown in FIG. 5. The packet 9 is composed of a header field 91 and a data field 92, and the destination is shown in the header field.

Next, the procedures of creating the forwarding table 22 will be explained.

As shown by 5a to 5d in FIG. 3, the data concerning the route information to be exchanged among switches input from lines are received by a route processor through a packet switch unit. The route processor 24 creates a route table 25 in processing the data of the route information according to a route control protocol.

Figure 8:
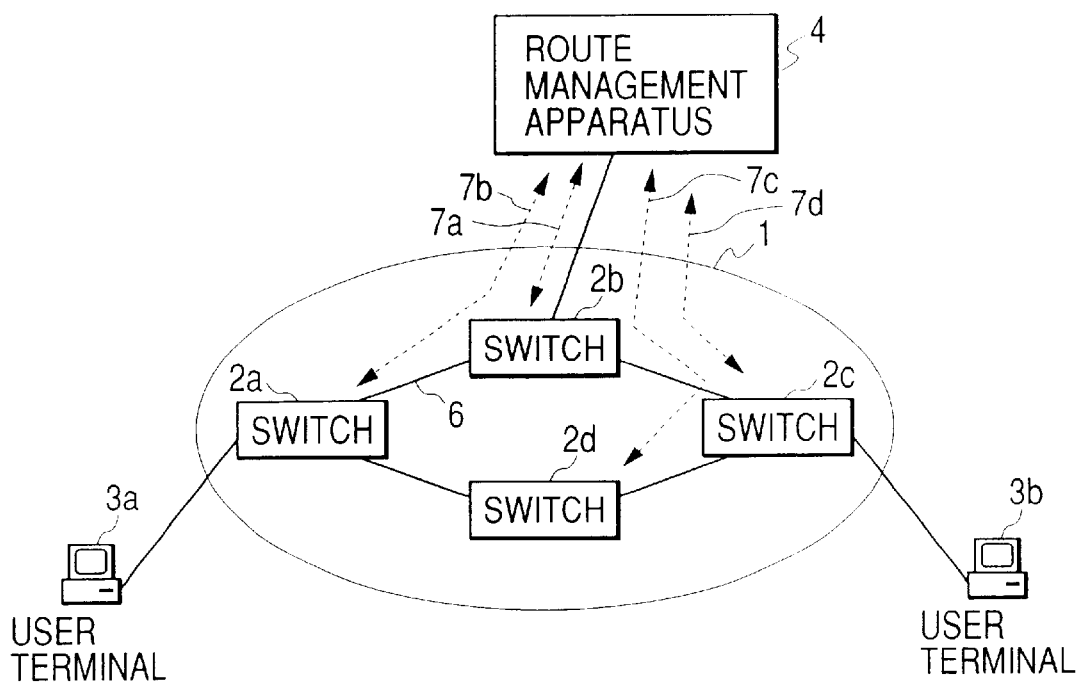
FIG. 8 shows an illustrative drawing showing the exchange of control information between switches and the route management apparatus in an embodiment.

FIG. 6 shows an illustrative drawing showing the contents of the route table 25. The route table 25 is created based on the route information exchanged among switches, and it shows the correspondence between the destinations and outgoing lines. As the outgoing line information, the creation of a table showing the correspondence between the discrimination information of outgoing lines and the discrimination information of a switch to be connected with will be also effective. The switches in the present embodiment use the information in the valid route table 27 as the information of the forwarding table 22. Because of this, they are provided with a creation means for creating the valid route table 27. FIG. 7 shows an illustrative drawing showing the contents of the valid route table 27. The valid route table 27, as shown in FIG. 8, is created through the exchanges of control information shown by 7a to 7d between respective switches, 2a to 2d, and the route management apparatus 4, and it shows the correspondence between the destinations and outgoing lines about a route permitted by the route management apparatus 4.

Figure 9:
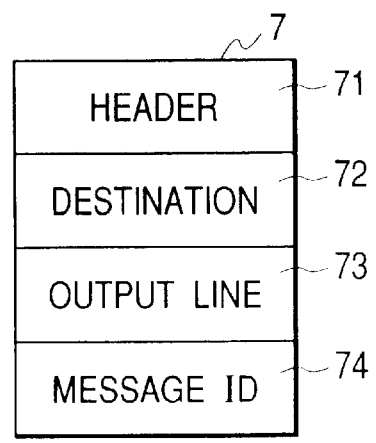
FIG. 9 shows an illustrative drawing showing the configuration of a route-usage-permission-request in a first embodiment.
Figure 10:
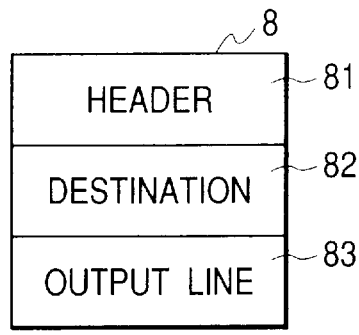
FIG. 10 shows an illustrative drawing showing the configuration of a route-usage-permission-notice in the first embodiment.
Figures 20, 21:
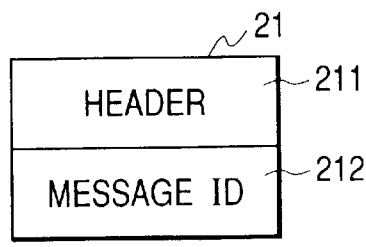
FIG. 20 shows an illustrative drawing showing an example of the whole forwarding table held by the route management apparatus in the second embodiment.
FIG. 21 shows an illustrative drawing showing the configuration of a receipt confirmation of a rout-usage-permission-request in the first embodiment.

In the following the control information described in the above will be explained. FIGS. 9, 10 and 21 show illustrative drawings showing the contents of a route-usage-permission-request, a route-usage-permission-notice, and a receipt confirmation of a route-usage-permission-request. These are the control information used for the information exchange between respective switches, 2a to 2d, and the management apparatus 4.

In FIG. 9, a route-usage-permission-request 7 has a role of notifying the route management apparatus 4 of the update of the route table in a switch, and comprises a header field 71, a destination field 72, an outgoing line field 73 and a message ID field 74. A route-usage-permission-request 7, taking the opportunity of the update of an entry on the route table 25 of a switch, is transmitted to the route management apparatus 4 from the switch. The header field 71 contains the address of the route management apparatus, etc. which are needed to transmit the route-usage-permission-request to the route management apparatus from a switch in the network. The destination field 72 and the outgoing line field 73 contain respectively the destination information and the outgoing line information of the updated entry of the route table 25 which has become the motive of the transmission of control information. The discrimination information of a switch connected to an outgoing line can be contained in the outgoing line information. The message ID field 74 contains a discrimination number showing the request uniquely.

In FIG. 10, the route-usage-permission-notice 8 has a role of notifying the switch which transmitted a route-usage-permission-request of the confirmation of validity of the route and the setting permission of the information on the forwarding table, and comprises a header field 81, a destination field 82, and an outgoing line field 83. The route-usage-permission-notice 8, after the receipt of a route-usage-permission-request by the route management apparatus 4, verifies the validity of the updated entry notified by the route-usage-permission-request following the procedures to be described later, and after that it is returned to the switch from the route management apparatus 4. The header field 81 contains the information such as an address of a switch which is needed to transmit the route-usage-permission-notice 8 from the route management apparatus 4 to a designated switch in the network. The information contained in the destination field 82 and the outgoing line field 83 contain the destination information and the outgoing line information to be added to or to be overwritten on the valid route table 27.

In FIG. 21, the receipt confirmation of a route-usage-permission-request 21 has a role of notifying a switch of the receipt of the route-usage-permission-request, and comprises a header field 211 and a message ID field 212. The header field 211 contains information such as the address of a switch which is needed to transmit the receipt confirmation of a route-usage-permission-request 21 to a switch designated by the route management apparatus 4 in the network. The message ID field 212 is the message ID of the route-usage-permission-notice which notifies a switch of a route to be permitted. The receipt confirmation of a route-usage-permission-request 21, after the receipt of the route-usage-permission-request 7 is returned to the switch immediately from the route management apparatus 4. However in the case where it is possible to transmit the route-usage-permission-notice immediately, there is no need to return a receipt confirmation of a route-usage-permission-request 21.

Figures 24, 25:
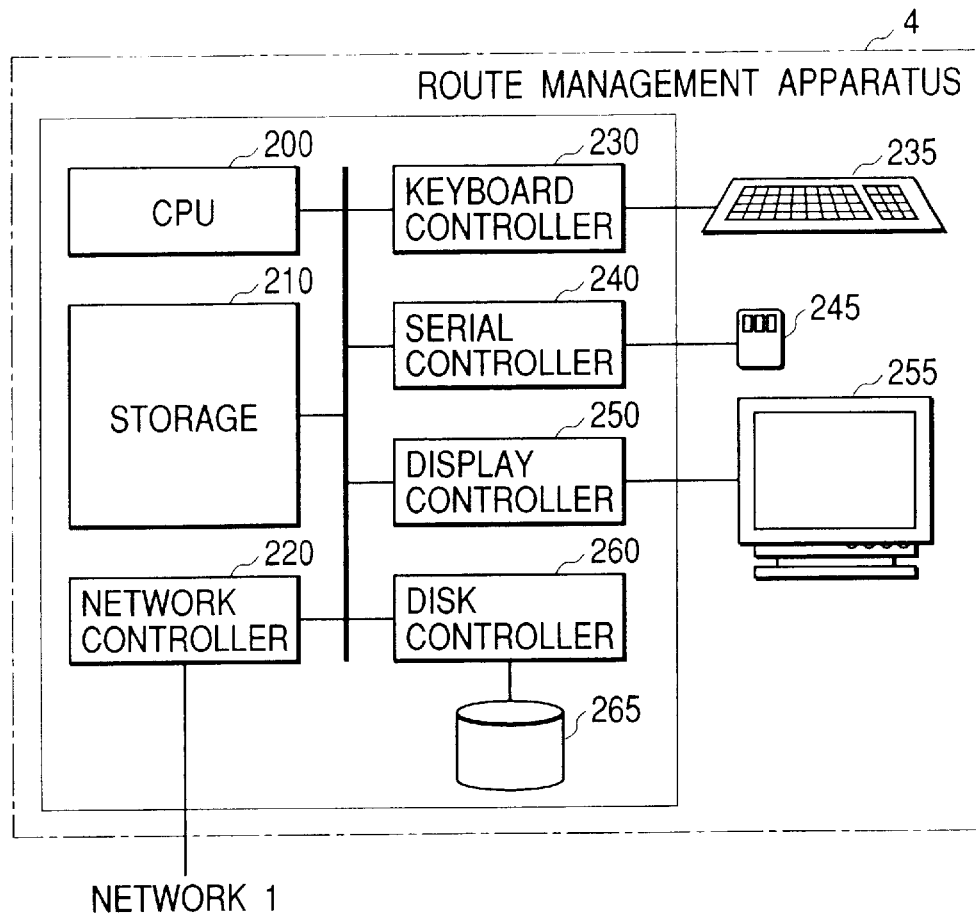
FIG. 24 shows the configuration of the hardware of the route management apparatus 4 in the embodiment.
FIG. 25 shows an illustrative drawing showing an example of a route table in a switch 2d.

Next, the route management apparatus will be explained. In FIG. 24, the hardware configuration of the route management apparatus is shown. In FIG. 24, the route management apparatus 4 can be realized by a computer with a communication function. A CPU 200 reads the program stored in a memory 210 and executes it. In the memory 210, the software for realizing a process in the route management apparatus in the present embodiment is stored. The CPU 200 performs transmission/reception of data with the network 1 using a network controller 220. The CPU 200 makes an access to a disk unit 265 (floppy disk unit or hard disk unit) using a disk controller 260. Further it accepts the input information from a keyboard 235 or a mouse 245 through a keyboard controller 230 and a serial controller 240, and makes display on a display 255 using a display controller 250. It is also possible to control the route management apparatus 4 with a computer located at a distant place through a serial port or a network. In this case, the user interface such as a display, a keyboard, a mouse, etc. are not needed.

Figure 11:
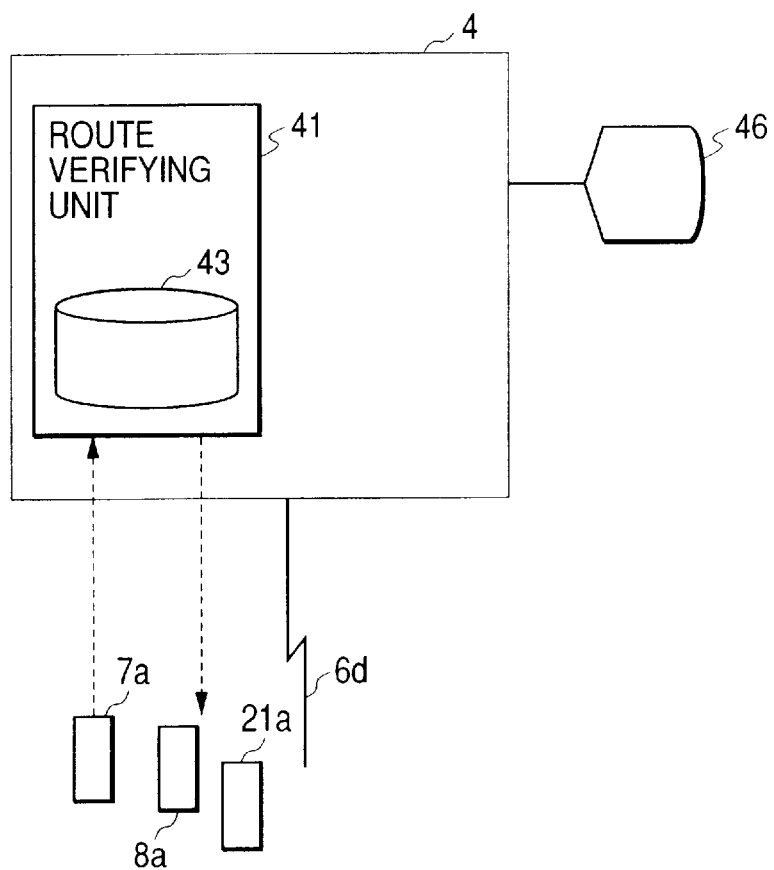
FIG. 11 shows an illustrative drawing showing the configuration of a route management apparatus in the first embodiment.

FIG. 11 shows a functional block diagram of the route management apparatus.

In FIG. 11, to be concrete, the route management apparatus can be realized by a computer such as a PC, and respective functions can be realized with software. As shown in FIG. 11, the route management apparatus 4 is connected to the network with a communication line 6d. The route management apparatus 4 is provided with a route verification unit 41, and the route verification unit 41 holds the whole forwarding table 43 for the whole network including all information in the forwarding tables held by all switches in the network.

FIG. 12 shows an illustrative drawing showing the contents of the whole forwarding table 43.

The whole forwarding table 43 is constituted with route control information from respective switches, and the discrimination information of outgoing lines corresponding to every destination by switches is shown on it. Further, the discrimination information of the switches connected to the outgoing lines can be also stored. For the discrimination information of the switches connected to the outgoing lines, it is also good to provide another table.

In the following, the process procedures in the route management apparatus, from the receipt of a route-usagepermission-request 7 till the replies of a route-usage-permission-notice 8 and a receipt certificate of a route-usage-permission-request 21 will be explained.

When the route management apparatus 4 receives a route-usage-permission-request 7, with the route verification unit 41 shown in FIG. 11, it verifies the validity the route information composed of the destination information and the outgoing line information contained in the route-usage-permission-request 7 using the information on the whole forwarding table. The verification of validity means, for example, to verify the occurrence of a loop in the route in adding the route information to the forwarding table of the switch. The route verification unit 41 is made possible to verify the validity of a route owing to the whole forwarding table 43 which contains the information held by all the switches in the network. For example, in the whole forwarding table 43 shown in FIG. 12, the route from the terminal 3b to the destination 3a, from the outgoing line 6e of a switch 2c—the outgoing line 6a of a switch 2b—the outgoing line 6c of a switch 2a—the terminal 3a, is considered to be valid.

The route verification unit 41, if the route information is valid, adds it to or over-writes it on the whole forwarding table 43, and also writes the destination information and the outgoing line information onto the destination field 82 and the outgoing line field 83 in the route-usage-permission-notice 8, and returns the route-usage-permission-notice 8 to the switch.

In a case where the route information is not valid, the route information is reserved until the route is made valid by new information obtained from the receipt of another route-usage-permission-request. After that, when the route has been made valid by another route-usage-permission-request, in the similar manner to the above, the route information is added to or over-written onto the whole forwarding table and also the updated destination information and outgoing line information in respective switches are written onto the destination field 82 and the outgoing line field 83 of the route-usage-permission-notice 8, and the route-usage-permission-notice 8 is sent back to respective switches which have transmitted route-usage-permission-requests.

As mentioned in the above, the abnormality in a line having the possibility of occurrence in the network can be prevented by reserving the use of an invalid information.

In a case where the reservation as mentioned in the above is performed, it can be prevented that the switch 2 which transmitted the route-usage-permission-request mistakes that a fault has occurred in the route management apparatus 4 by sending back a receipt confirmation of a route-usage-permission-request 21 in which a message ID is written included in the reserved route-usage-permission-request 7 to the switch 2 immediately.

When there is a route which is left in a reserved state for a predetermined period of time, it is also possible that the route management apparatus 4 informs a network manager of the state as the matter in a route. Since the route management apparatus is constituted, for example, by a PC, as a method of notice, a display on the display 46, an output of an alarm, and such are possible.

Figure 13:
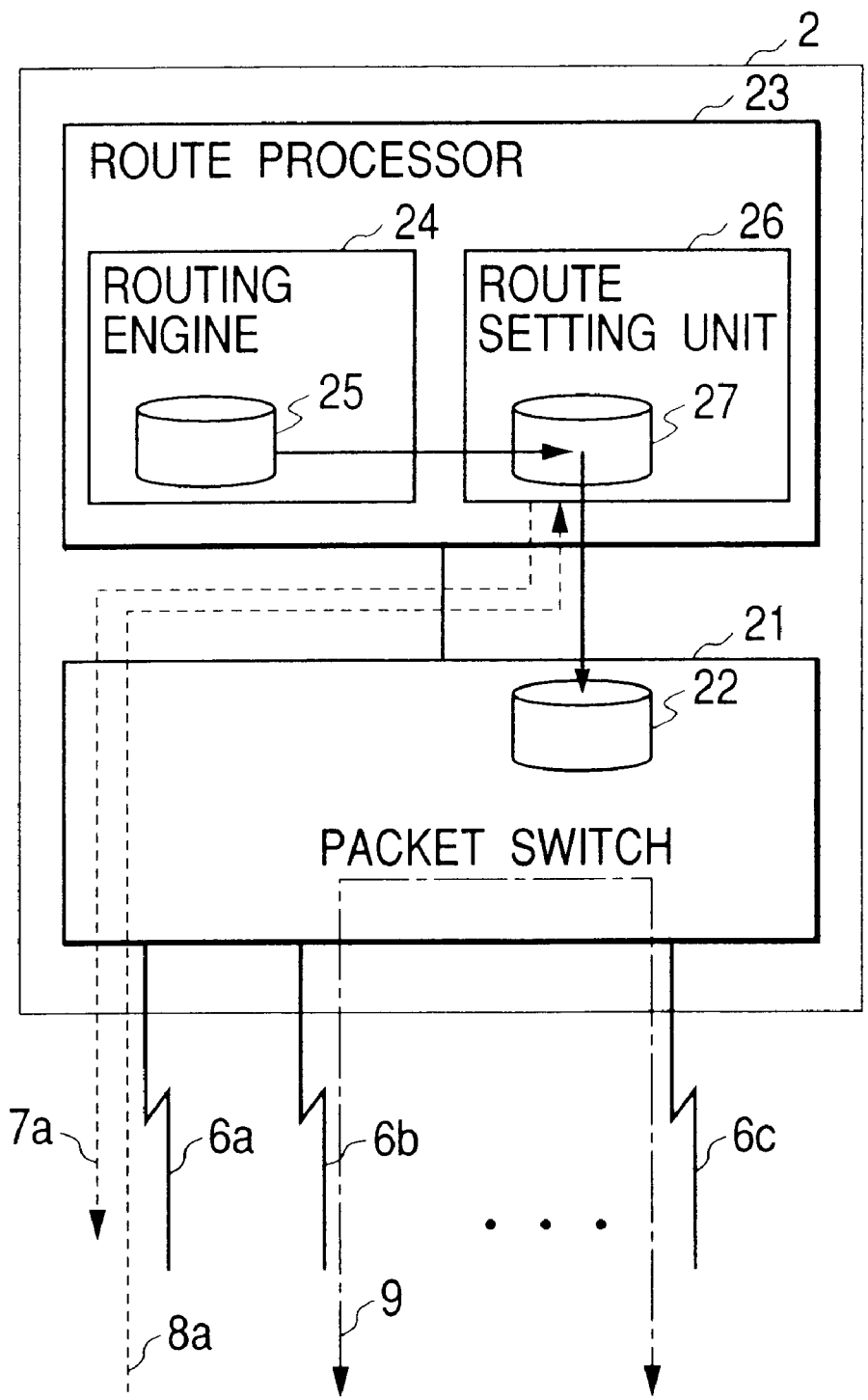
FIG. 13 shows an illustrative drawing showing the flow of the update procedures of a forwarding table in a switch according to the present invention.

Next, the process in a switch will be explained referring to FIG. 13. FIG. 13 shows the functional block diagram of a switch 2a. In FIG. 13, the transmission of a route-usage-permission-request 7a from the switch 2a to the route management apparatus 4, and the reception of a route-usage-permission-notice 8a from the route management apparatus 4 to the switch 2a will be cited as an example, and the example will be explained in the following.

In FIG. 13, a route setting unit 26 transmits a route-usage-permission-request 7a to the route management apparatus 4 taking the opportunity of the entry-update of a route table 25 in the route processor 24. A valid route table 27 is updated with the reception a route-usage-permission-notice 8a showing the setting permission. Further together with the update of the valid route table 27, the forwarding table 22 is updated. In other words, the route tables 25 are the route information made by respective switches independently, while the valid route table 27 is the route information which is once confirmed that it is valid for the whole network by the route management apparatus 4.

The transfer of packets are performed according to the forwarding table 22 which has the same information as that of the valid route table 27, so that there occurs no problem such as a packet loop which has a possibility of occurrence in an ordinary switch.

The switch 2 receives either the route-usage-permission-notice 8 or the receipt confirmation of a route-usage-permission-request 21 in a predetermined period of time so far as the route management apparatus 4 is in a normal state. Therefore, in a case where no information is received after the lapse of a predetermined period of time, it is judged that a fault has occurred in the route management apparatus 4, and the information on the route table 25 is set on the forwarding table 22. Thereby, even if a fault occurs in the route management apparatus 4, the breakdown of the whole network can be avoided. The operation of a switch in the network is shown in FIG. 14 and the operation in the route management apparatus is shown in FIG. 22; both operations are shown in the present embodiment which have been explained in the above.

Figure 14:
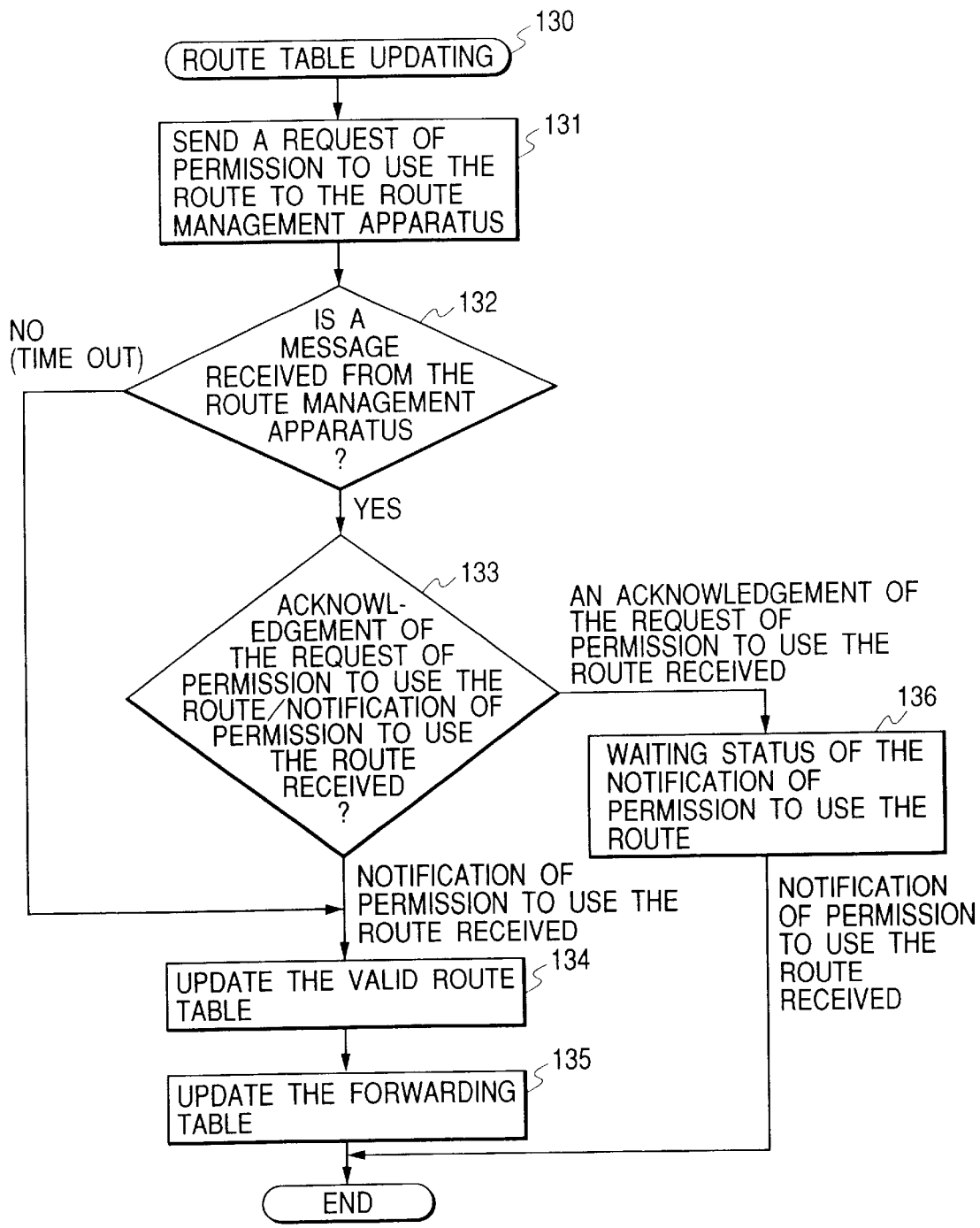
FIG. 14 shows a flowchart showing the flow of update procedures of a forwarding table in the first embodiment.

As shown in FIG. 14, the switch 2 transmits a route-usage-permission-request 7 to the route management apparatus 4 (step 131) taking the opportunity of the update of the route table 25 (step 130).

Figure 22:
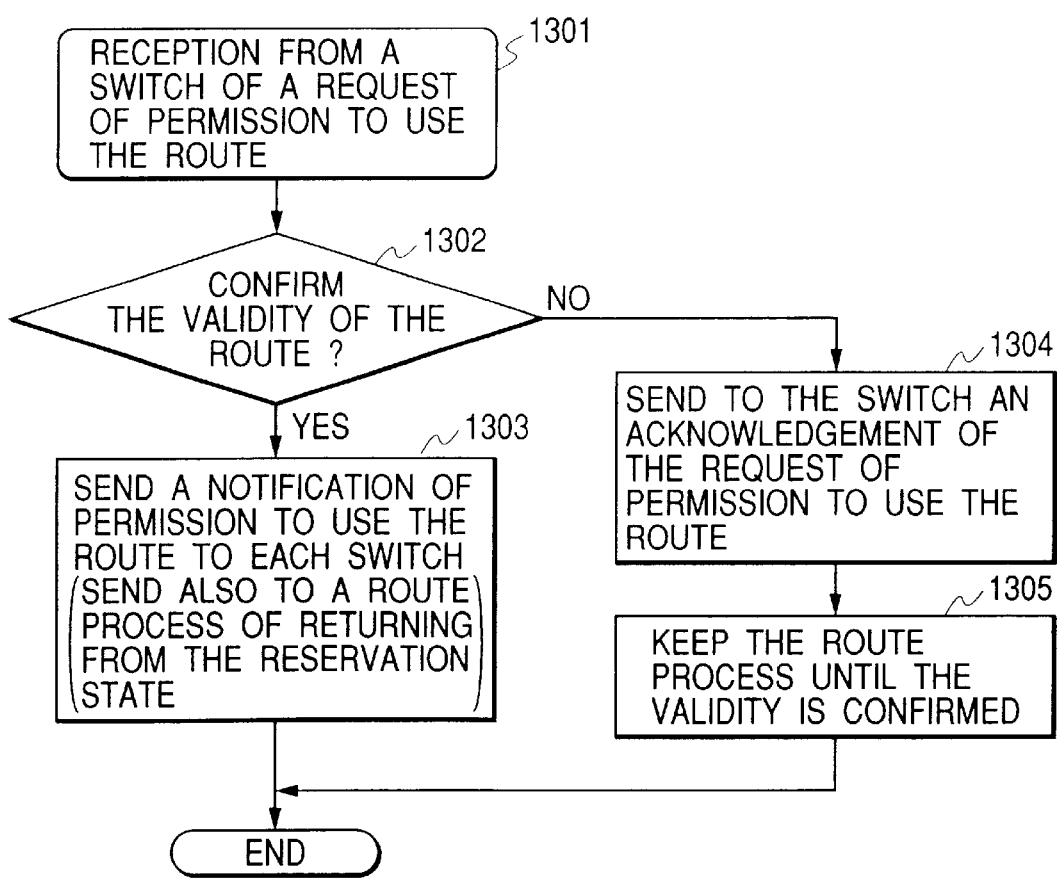
FIG. 22 shows a flowchart showing the flow of procedures of the route management apparatus in the update of a forwarding table in the first embodiment.

As shown in FIG. 22, the route management apparatus 4 receives a route-usage-permission-request 7, an update notice, from a switch (step 1301) and verifies the validity of the route information, in another saying, confirms that a loop, etc. do not occur in the route, using the whole forwarding table 43 (step 1302), and if the result of verification is valid, it transmits a route-usage-permission-notice 8, a confirmation notice of validity, to the switch (step 1303). If the result of verification is not valid, the route management apparatus transmits a receipt confirmation of a route-usage-permission-request 21 to the switch (step 1304), and reserves the process concerning the route until the route is made valid by the information obtained by the reception of a control information of the other switch, an update notice, (step 1305). About the reserved route, at a time when the route is made valid by the route-usage-permission-request from other switch, a route-usage-permission-notice 8, a setting permission notice, is transmitted to the switch 2 (step 1303). When the reserved period of time is over a predetermined period of time, the route management apparatus 4 notifies the network manager as an abnormality in a line.

As shown in FIG. 14, on receiving a message from the route management apparatus (step 132) the switch 2 judges that the massage is a receipt confirmation of a route-usage-permission-request 21 or a route-usage-permission-notice 8 (step 133), and if it is a route-usage-permission-notice 8 the switch updates the valid route table 27 according to the received information (step 134). Further it updates the forwarding table 22 by the same information which updated the valid route table 27 (step 135), and the process is completed.

The packet switching unit 21 of the switch 2 shown in FIG. 13 transfers a packet according to the forwarding table 22. The switch which received a receipt confirmation of a route-usage-permission-request enters a wait state for receiving a route-usage-permission-notice concerning the process of the route (step 136).

In a case where the switch 2 receives neither a route-usage-permission-notice 8 nor a receipt confirmation of a route-usage-permission-request in a predetermined period of time after the transmission of a route-usage-permission-request 7, considers that a fault has occurred in the route management apparatus 4, and it sets the contents of the route table 25 made by itself on the forwarding table 22. Since it is considered that a fault has occurred in the route management apparatus when the switch receives neither a route-usage-permission-notice 8 nor a receipt confirmation of a route-usage-permission-request 7 for a predetermined period of time, the respective switches operate independently in the autonomous decentralized manner, so that the breakdown of the whole system can be avoided.

Next, the verification of a route and the route information will be explained citing concrete examples referring to FIG. 32.

Figure 32:
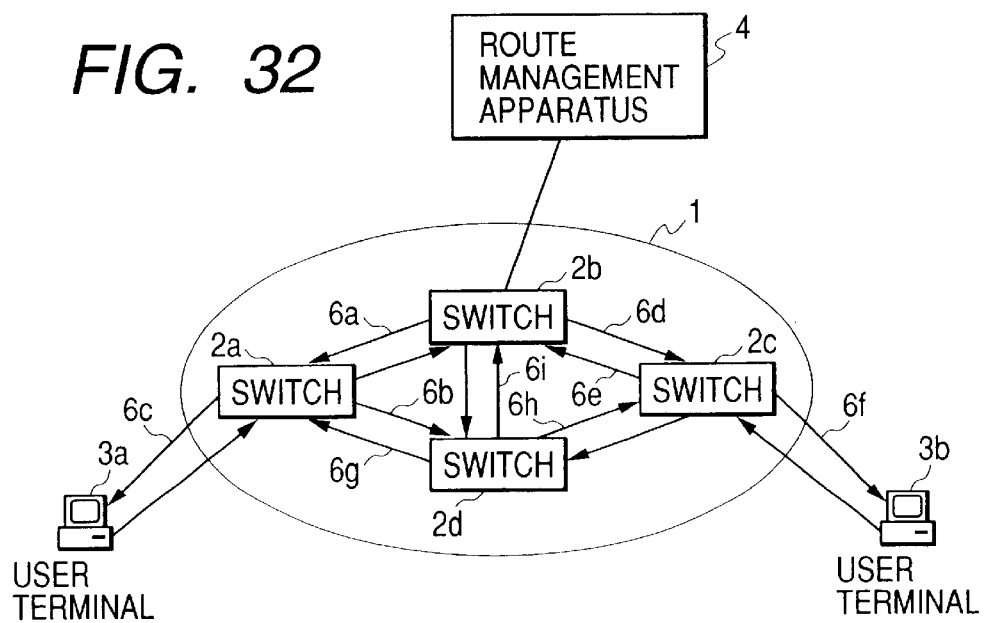
FIG. 32 shows an illustrative drawing showing an example of a line between switches in the first embodiment.

Assuming that, as shown in FIG. 32, outgoing lines connecting switches to each other are provided without fail, and the contents as shown in FIG. 12 are set initially on the whole forwarding table 43 of the route management apparatus 4, and the case where a fault occurs in the outgoing line 6h will be cited as an example.

Figure 26:
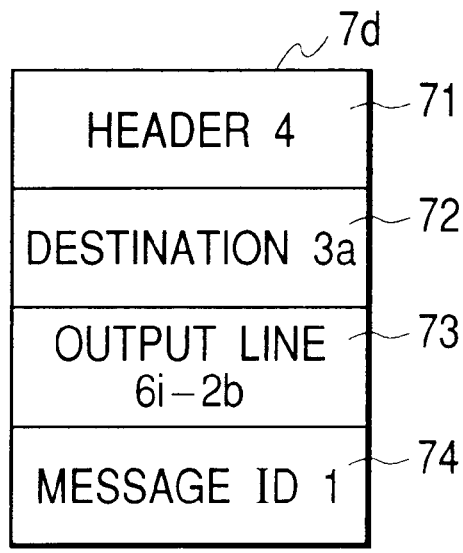
FIG. 26 shows an illustrative drawing showing the configuration of a route-usage-permission-request in the first embodiment.
Figure 27:
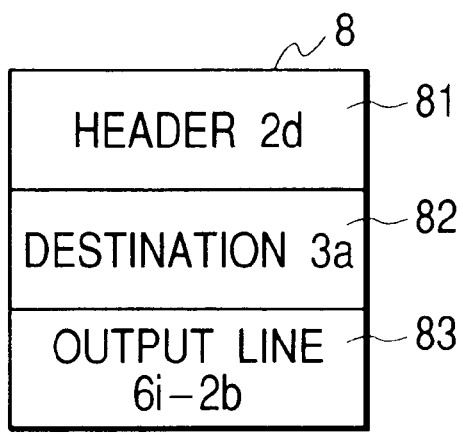
FIG. 27 shows an illustrative drawing showing the configuration of a route-usage-permission-notice in the first embodiment.

The switch 2d, at the occurrence of a fault in the outgoing line 6h, concerning the communication with the destination 3b, in which 6h has been used, in order to use another route, 6i–2b, as shown in FIG. 2, communicates with the switch 2b to inform it that the switch 2d is going to use 6i concerning the communication with 3b, and updates the route table 25d to that as shown in FIG. 25. Further, it transmits a packet of a route-usage-permission-request as shown in FIG. 26 to the route management apparatus 4. When the outgoing line 6h is changed to the outgoing line 6i, according to the whole forwarding table 43 as shown in FIG. 12, the route to the terminal 3b becomes, the outgoing line 6i of the switch 2d—the outgoing line of the switch 2b—the outgoing line 6f of the switch 2c—the terminal 3b, and the route can be judged to be valid by the route management apparatus 4. Therefore, the route management apparatus 4 transmits a packet of a route-usage-permission-notice as shown in FIG. 27 to the switch 2d, and updates the contents of the whole forwarding table 43 as shown in FIG. 28. In the switch 2d which received a route-usage-permission-notice, the contents in the route table shown in FIG. 25 are updated with the same data as described in the above and the forwarding table 22 is also updated with the same data, and the switching process is performed according to the updated contents. Thereby, even if a fault occurs in a route, it is possible to transfer the information through another route.

Next, in the case described in the above, an example is cited wherein it is assumed that a further fault occurs in the outgoing line 6d of the destination 3b or a software bug is found in the route change process, and in the switch 2b, the route table 25b has been rewritten as shown in FIG. 29.

Figure 30:
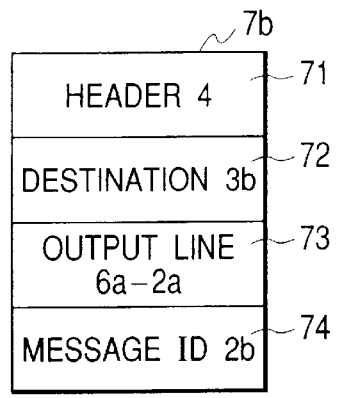
FIG. 30 shows an illustrative drawing showing the configuration of a route-usage-permission-request in the first embodiment.
Figure 31:
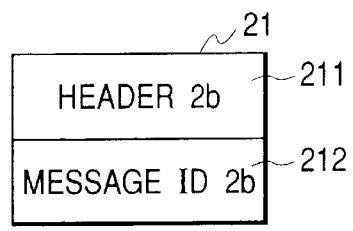
FIG. 31 shows an illustrative drawing showing the configuration of a receipt confirmation of a route-usage-permission-request in the first embodiment.

In this case, the switch 2b transmits a packet of a route-usage-permission-request as shown in FIG. 30 to the route management apparatus 4. According to the whole forwarding table 43 as shown in FIG. 28, when the outgoing line of the switch 2b is switched to 6a, the route to the destination 3b becomes, the outgoing line 6a of the switch 2b—the outgoing line 6b of the switch 2a—the outgoing line 6i of the switch 2d—the outgoing line 6a of the switch 2b, thus a looped route occurs, so that the route management apparatus 4 will judge that the route is not valid. Therefore, the route management apparatus 4 transmits a packet of the receipt confirmation of a route-usage-permission-request as shown in FIG. 31 to the switch 2b, and the route switching to the outgoing line 6a is not permitted and kept in a reserved state. After that, when the reverved state is kept as it is for a predetermined period of time, the route management apparatus 4 notifies the network manager of the reserved state concerning the route switch of the outgoing line 6a of the switch 2b. Thereby it is made possible to detect the occurrence of an abnormal route. During the reserved state, when the recovery of the outgoing line 6h in the switch 2d is detected, the 6i can be switched back to 6h–2b, so that the route table 25d is updated, and further the switch 2b transmits a packet of a route-usage-permission-request to the route management apparatus 4. According to the whole forwarding table 43 as shown in FIG. 28, the route to the destination 3b, when the outgoing line is switched to the outgoing line 6h, becomes, the outgoing line 6h of the switch 2d—the outgoing line 6f of the switch 2c—the terminal 3b, and it can be judged to be valid by the route management apparatus 4. Therefore, the route management apparatus 4 transmits a packet of a route-usage-permission-notice to the switch 2b and updates the contents of the whole forwarding table 43 as shown in FIG. 12. Further about the lines kept in the reserved state are judged to be valid. In this case, when the outgoing line is switched to the outgoing line 6a, the route becomes, the outgoing line 6a of the switch 2b—the outgoing line 6b of the switch 2a—the outgoing line 6h of the switch 2d. It can be judged to be valid. Therefore, a route-usage-permission-notice is transmitted to the switch 2b. The switch 2b which received the route-usage-permission-notice updates the contents of the route table as shown in the forwarding table 22 and switching process is performed according to the updated contents.

According to the first embodiment in the present invention, the validity of the route information is verified by the fact whether information arrives at a proper destination or not, that is, for example, by detecting the occurrence of a looped route, and when a temporary line abnormality occurs, the network is able to correspond to the trouble using other valid route. When a route is judged not to be valid, the route is not permitted, so that the setting of an abnormal route through which the transmitted data do not arrive at the destination such as a looped route can be avoided.

Next, the second embodiment will be explained. In the first embodiment the route control protocol judges the validity of a route information based on the fact whether the transmitted data arrive at the destination normally or not, but in the second embodiment the validity of a route is judged further using the management policy of the network. Owing to such a route control system, for example, it is made possible to perform a setting to use an arbitrary route when there are plurality of routes to reach a destination.

In the following, the second embodiment considering the management policy will be explained centering the points being different from the first embodiment.

An important different point between the first embodiment and the second embodiment lies in the configuration of the route management apparatus. The functional block diagram of the route management apparatus 4A being used in the second embodiment is shown in FIG. 15.

Figures 15, 16:
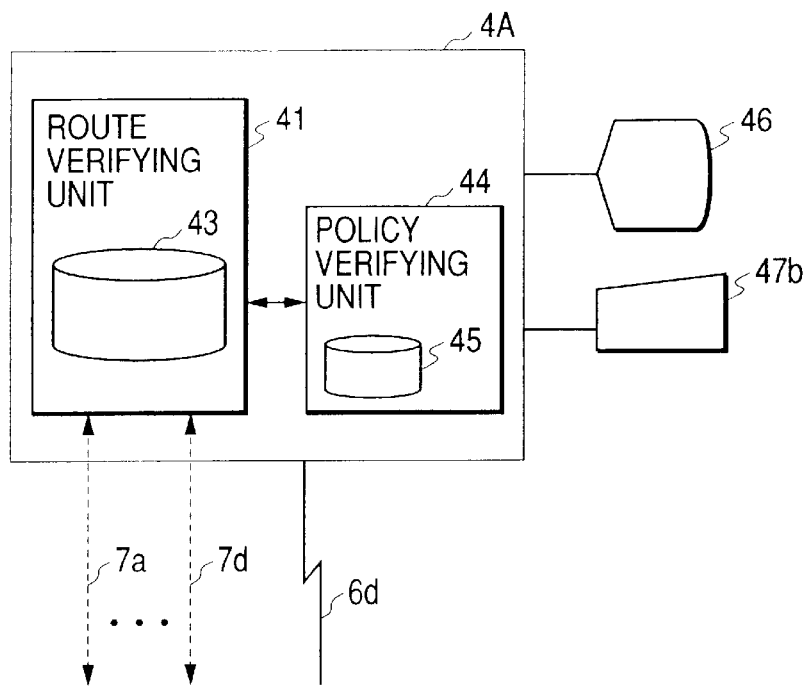
FIG. 15 shows an illustrative drawing showing the configuration of a route management apparatus in a second embodiment.
FIG. 16 shows an illustrative drawing showing an example of the whole forwarding table held by a route management apparatus in the second embodiment.

As shown in FIG. 15, the different point of the route management apparatus 4A from the route management 4 in the first embodiment is that the former is provided with a policy verification unit 44 having a management policy information 45.

In the first embodiment, the validity of a route is verified by the fact that the transmitted data are able to arrive at the destination through the route using the whole forwarding table 43; however, in the second embodiment, in addition to the above, the validity for the management policy is also verified. Therefore, the route management apparatus 4A comprises the management policy information 45 and the policy verification unit 44 for verifying the validity for the management policy.

The management policy information is set by a manager with an input unit 47b. As the input unit, storage media such as a keyboard, a mouse, a hard disk, etc. can be used. The management policy information is equivalent to the policy information set in respective switches, and the route management apparatus 4A verifies if respective switches perform route selections which correctly reflect the management policy using the policy information.

FIG. 16 show an illustrative drawing showing the contents of the management policy information 45. In this place, an example of the management policy is shown in which the advisability of usage of an outgoing line is decided by destinations.

The route management apparatus 4A, on receiving a route-usage-permission-request 7, verifies the validity of the route information being composed of the destination information and the outgoing line information included in the route-usage-permission-request in the route verification unit 41 with the information in the whole forwarding table.

The verification of validity means that, for example, the route verification unit 41 verifies if the transmitted data arrive at the destination normally without being interrupted by a looped route, etc. in adding the route information to the forwarding table of a switch, and in addition to the above, the policy verification unit 44 verifies that the route information is not against the management policy with the management policy information 45.

The route verification unit 41, when the route information is valid, in the similar manner to the first embodiment, adds the information to or over-writes it on the whole forwarding table, and also writes the destination information and the outgoing line information onto the destination field and the outgoing line field of a route-usage-permission-notice 8 and transmits the route-usage-permission-notice 8 to the switch 2.

In a case where the route is not judged to be valid, in a similar manner to the first embodiment, the route verification unit 41 transmits a receipt confirmation of the route-usage-permission-request, and reserves the process concerning the route. In a case where the route information is against the management policy, the route management apparatus 4A informs the manager of the fact. The route management apparatus 4A is, for example, composed of a PC, so that as a method of notification a display on the display 46, an output of an alarm, etc. can be considered.

With the above mentioned process procedures, the transfer of a packet being against the management policy can be prevented.

The transfer of a packet being against the management policy can occur, for example, due to an erroneous setting of a route control protocol; however, according to the present embodiment, in a case where an erroneous setting of the route control protocol is made, it is judged to be against the management policy; thereby, an erroneous operation caused by an erroneous setting can be prevented.

Figure 19:
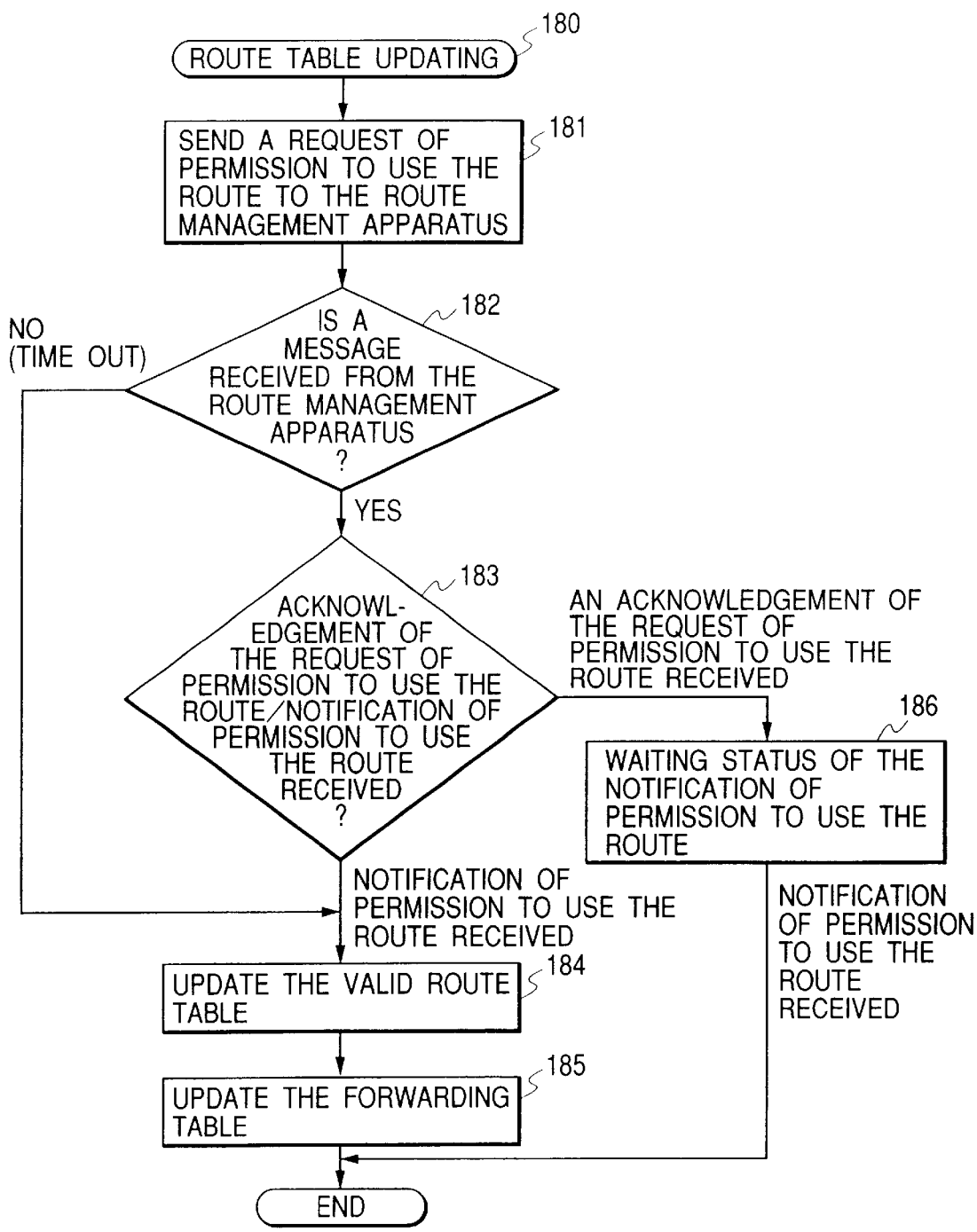
FIG. 19 shows a flowchart showing the flow of update procedures of a forwarding table in the second embodiment.
Figure 23:
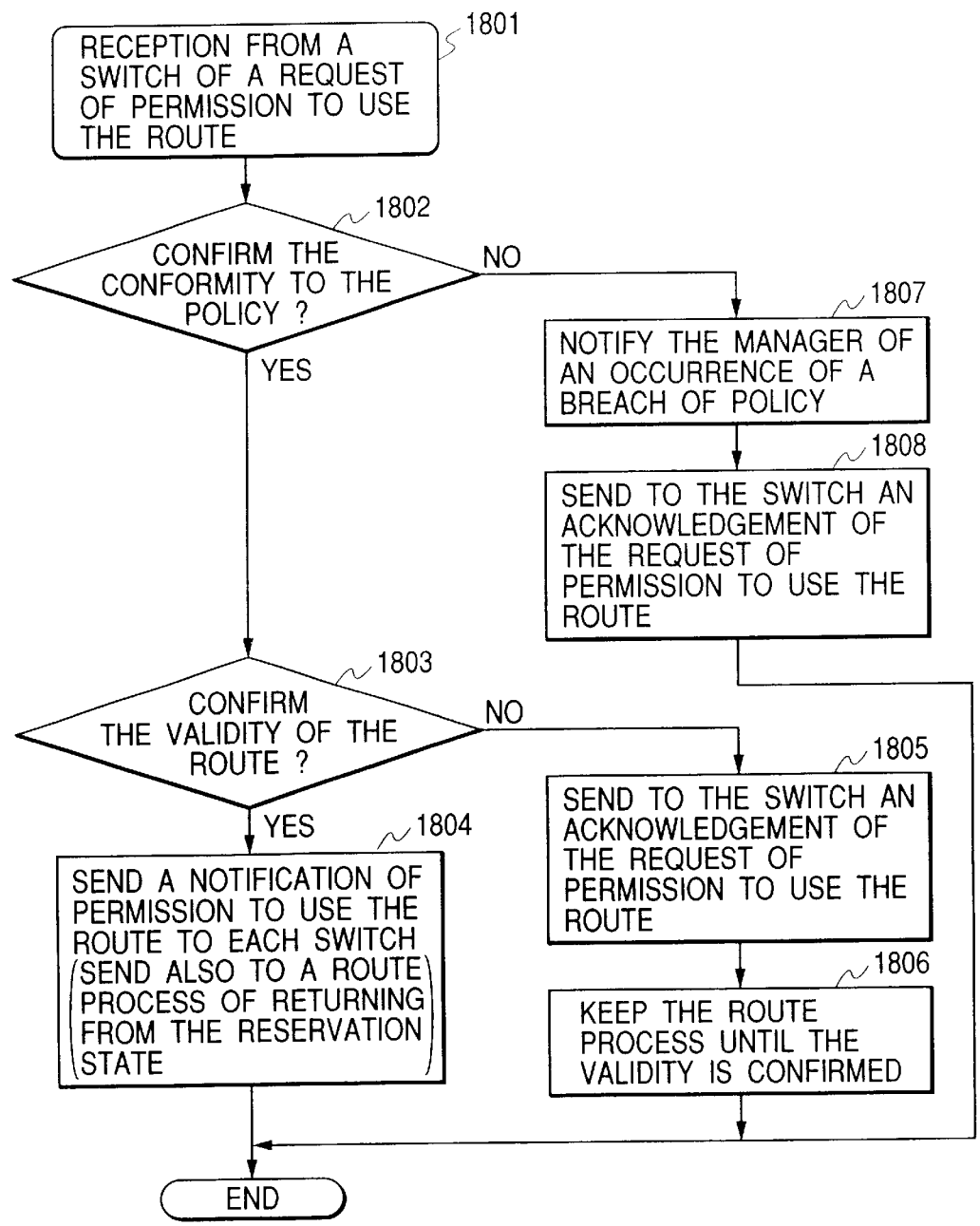
FIG. 23 shows a flowchart showing the flow of procedures of the route management apparatus in the update of a forwarding table in the second embodiment.

A process flowchart in a switch in the network used in the second embodiment according to the present invention is shown in FIG. 19, and the process flowchart in the route management apparatus is shown in FIG. 23.

In FIG. 19, the switch 2 transmits a route-usage-permission-request 7 which can be an update notice to the route management apparatus 4A (step 181) in taking the opportunity of the update of the route table 25 (step 180).

In FIG. 23, the route management apparatus 4A, on receiving the route-usage-permission-request 7, an update notice, from a switch (step 1801), verifies the request if there is anything against the management policy in it (1802) using the management policy information 45, and if the result is judged not to be valid, the apparatus will inform the manager of the infringement of the management policy (step 1807), and sends back the receipt confirmation of the route-usage-permission-request 21 to the switch, and the process procedures are completed.

If the result is judged to be valid, (step 1802), it verifies that the looped route is not produced with the whole forwarding table 43 (1803), and if the result is valid it transmits a route-usage-permission-notice 8, a confirmation notice of validity, to the switch 2, and when the result is not valid, it replies the receipt confirmation of the route-usage-permission-request 21 (step 1805), and it reserves the route as it is until the route is made valid by the information obtained by receiving another route-usage-permission-request, an update notice (step 1806), and at a time when the route is recovered to be valid, it transmits a route-usage-permission-notice 8, a notice of setting permission, to the switch (step 1804). When the period time of reservation passes over a predetermined period of time, it notifies the network manager of the fact as an abnormality in a route.

In FIG. 19, the switch 2, on receiving a message from the route management apparatus (step 182), it judges if the message is a receipt confirmation of a route-usage-permission-request 21 or a route-usage-permission-notice 8 (step 183), and if the message is a route-usage-permission-notice 8, it updates the valid route table 27 according to the information (step 184). Further, the forwarding table 22 is updated with the same information as that updated the valid route table 27, and thus the process procedures are completed. The packet switch unit 21 of the switch 2 transfers packets according to the forwarding table 22.

A switch, on receiving the receipt confirmation of a route-usage-permission-request 21 enters a wait state for the reception of a route-usage-permission-notice (step 186). In a case where the switch 2, after the transmission of a route-usage-permission-request 7, in a predetermined period of time, receives neither a route-usage-permission-notice 8 nor a receipt confirmation of a route-usage-permission-request 21 (step 182), it considers that a fault has occurred in the route management apparatus, and it sets the contents of a route table made by itself on the forwarding table 22.

In the above explanation, an example in which as a management policy, the advisability of the usage of a line for a destination is cited; however, it is also possible for a transmitter to provide other management policy which controls the usage advisability of a line.

In this case, the different points from those in the above explanation are the management policy information and the control packet.

FIG. 20 shows an illustrative drawing showing the contents of the management policy information 45A.

In this case as a management policy, an example is shown in which the advisability of the usage of outgoing lines is decided according to a transmitter and the destination.

Figure 17:
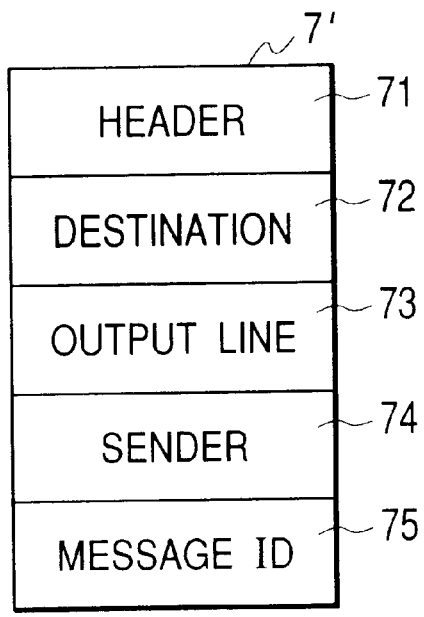
FIG. 17 shows an illustrative drawing showing the configuration of a control information from a switch to the route management apparatus in the second embodiment.
Figure 18:
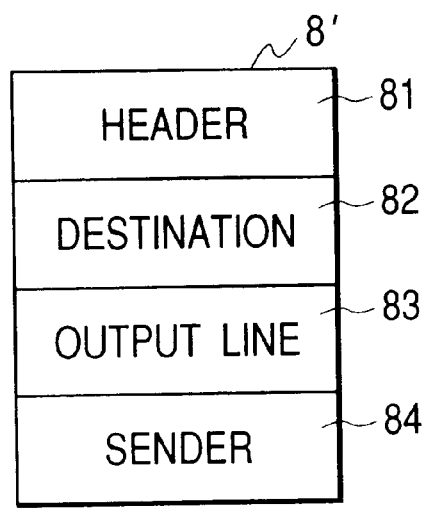
FIG. 18 shows an illustrative drawing showing the configuration of a control information from the route management apparatus to a switch in the second embodiment.

FIG. 17 and FIG. 18 show illustrative drawings showing the contents of a route-usage-permission-request 7A and a route-usage-permission-notice 8A of control packets to be used for the exchange of information between the switches, 2a to 2d, and the route management apparatus 4A.

In FIG. 17, the route-usage-permission-request 7A comprises a transmitter field 74 in addition to a header field 71, a destination field 72, an outgoing line field 73 and a message ID field 75. The transmitter field 74 shows the discrimination information of a transmitter which is needed to the verification of the validity for the management policy in the management apparatus.

In FIG. 18, the route-usage-permission-notice 8A comprises a transmitter field 84 in addition to a header field 81, a destination field 82 and an outgoing line field 83. The transmitter field shows the discrimination information of the transmitter which is needed to the verification of the validity for the management policy in the management apparatus.

The receipt confirmation for a route-usage-permission-request 21 comprises the same role and the same format as those shown in the first embodiment.

In FIG. 15, the route management apparatus 4A, on receiving a route-usage-permission-request 7A, verifies the validity of the route information being composed of a destination information 73, an outgoing line information 73 and a transmitter information 74 included in the route-usage-permission-request 7A. Thereby it is made possible that a transmitter is able to control the advisability of usage of lines.

According to the second embodiment, an erroneous setting of the route information in respective switches can be prevented. The network manager is capable of being informed of the occurrence of a route setting request being against the management policy.

As explained in the above, according to the present invention, it is made possible to obtain a network being resistant to a fault and also to prevent the occurrence of an abnormal line caused by a time lag in setting routes or by erroneous setting of a switch. It is also made possible to guarantee that the management policy is correctly reflected in the whole network.

What is claimed is:

1. A network system comprising:
   a communication network composed of communication lines to which a plurality of switches are connected; and
   a route management apparatus with a route verification means for verifying the validity of a communication route having at least one of a terminal and a switch connected to at least one of another terminal and switch, each of said route management apparatus, said terminal and said switch being connected to said communication network;
   each of said plurality of switches including:
      a storage means for storing route information concerning a communication route corresponding to a destination;
      a switch means for outputting information to a communication route corresponding to a destination included in the route information obtained by referring to said storage means;
      a transmitting means for transmitting a route-usage-permission-request of a route to be changed to said route management apparatus when said route information is changed; and
      an update means for updating the route information in said storage means when a switch receives a route-usage-permission-notice of a route to be changed, said route-usage-permission-notice being issued from said route management apparatus in response to said route-usage-permission-request.

2. A network system according to claim 1, wherein said route management apparatus further comprises:
   a storage means for storing route information for switches concerning a communication route between a terminal and a switch or between switches connected to a communication network composed of communication lines to which a plurality of switches are connected;
   a reception means for receiving a route-usage-permission-request when the route-usage-permission-request of a communication route between a terminal and a switch or between switches connected to said communication network is transmitted from one of the plurality of switches;
   said route verification means for verifying the validity of a communication route concerning said route-usage-permission-request;
   a notification means for notifying one of the plurality of switches which has transmitted said route-usage-permission-request of a usage permission of a route verified by said route verification means; and
   an update means for updating the route information which has been stored in said storage means for the route information of the communication route to which said permission notice is given.

3. A network system according to claim 1, wherein said route verification means further comprises:
   a verification means for verifying if the communication route between the terminal and the switch or between the switches is in conformity with a predetermined management policy.

4. A network system according to claim 1, wherein said route management apparatus further comprises:
   a notification means for notifying the switch which has transmitted the route-usage-permission-request of a receipt confirmation of the route-usage-permission-request, when it is verified that the transmitted route-usage-permission-request do not arrive at the destination through a permitted communication route; and
   wherein each of said plurality of respective switches further comprises:
      an update means for updating the stored route information which has been stored in the storage means for the communication route concerning said route-usage-permission-request, in the case where the switch receives neither a receipt confirmation of the route-usage-permission-request nor the route-usage-permission-notice when a predetermined period of time has passed after the transmission of the route-usage-permission-request.

5. A network system according to claim 4, wherein said route verification means further comprises:
   a reservation means for reserving route information when it is verified that the transmitted data do not arrive at the destination through the communication route concerning said route-usage-permission-request; and
   a verification means for verifying whether the transmitted data arrive at the destination through the communication route on the reserved route information or not, on receiving a route-usage-permission-request concerning related route information from other switch, based on said route-usage-permission-request from the other switch.

6. A network system according to claim 5, wherein said route management apparatus further comprises:

an output means for outputting to an external unit information that it has been verified during a predetermined period of time or over that the transmitted data do not arrive at the destination through the communication route concerning said route-usage-permission-request.

7. A route management apparatus comprising:

a storage means for storing route information for switches concerning a communication route between a terminal and a switch or between switches connected to a communication network composed of communication lines to which a plurality of switches are connected;

a reception means for receiving a route-usage-permission-request when the route-usage-permission-request of a communication route between a terminal and a switch or between switches connected to said communication network is transmitted from one of the plurality of switches;

a route verification means for verifying the validity of a communication route concerning said route-usage-permission-request;

a notification means for notifying one of the plurality of switches which has transmitted said route-usage-permission-request of a usage permission of a route verified by said route verification means; and an update means for updating the route information which has stored in said storage means for the route information of the communication route to which said permission notice is given.

8. A switch in a communication network system having a plurality of switches, communication lines connected to said switches, said communication network system further having a route management apparatus for managing the communication routes each having at least one of a terminal and a switch connected to at least one of another terminal and switch;

each of said switches comprising:

a storage means for storing route information concerning a communication route corresponding to a destination;

a switch means for outputting information to a communication route corresponding to a destination included in the route information obtained by referring to said storage means;

a transmitting means for transmitting a route-usage-permission-request of a route to be changed to said route management apparatus when said route information is changed; and an update means for updating the route information in said storage means when a switch receives a route-usage-permission-notice of a route to be changed, said route-usage-permission-notice being issued from said route management apparatus in response to said route-usage-permission-request.

9. A method of updating a communication route in a communication network composed of a plurality of switches each having a storage means, and communication lines connected to said switches, said method comprising the steps of:

storing in one of said storage means, route information concerning a communication route corresponding to a destination;

outputting information to a communication route corresponding to a destination included in the route information obtained by referring to one of said storage means;

transmitting a route-usage-permission-request of a route to be changed to a route management apparatus when said route information is changed, wherein said route management apparatus having a route verification means for verifying the validity of a communication route having at least one of a terminal and a switch connected to at least one of another terminal and switch, each of said route management apparatus, said terminal and said switch being connected to said communication network; and updating the route information which has been stored in said storage means on receiving a route-usage-permission-notice of a route to be changed, said route-usage-permission-notice being issued from said route management apparatus in response to said route-usage-permission-request.

10. A method of updating a communication route by a route management apparatus, said apparatus being connected to a communication network composed of communication lines to which a plurality of switches are connected, said method comprising the steps of:

storing route information for the switches concerning a communication route between a terminal and a switch or between switches connected to said communication network;

receiving a route-usage-permission-request of said communication route when the route-usage-permission-request of a communication route between a terminal and a switch or between switches connected to said communication network is transmitted from one of said plurality of switches;

verifying the validity of a communication route concerning said route-usage-permission-request;

a step of notifying one of the plurality of switches which has transmitted said route-usage-permission-request of a route-usage-permission of the route verified in said verifying step; and updating the route information stored in said storing step for route information of the communication route to which said usage-permission is notified.

11. A method of updating a communication route by a switch in a communication network composed of a plurality of switches, communication lines connected to said switches, said method comprising the steps of:

storing in one of said storage means, route information concerning a communication route corresponding to a destination;

outputting information to a communication route corresponding to the destination included in route information obtained by referring the stored route information;

transmitting a route-usage-permission-request of a route to be changed to a route management apparatus when said route information is changed, wherein said route management apparatus having a route verification means for verifying the validity of a communication route having at least one of a terminal and a switch connected to at least one of another terminal and switch, each of said route management apparatus, said terminal and said switch being connected to said communication network; and updating said stored route information on receiving a route-usage-permission-notice of said route to be updated, said route-usage-permission- notice being issued from said route management apparatus in response to said route-usage-permission-request.

* * * * *